United States Patent
Boe et al.

(10) Patent No.: US 7,051,976 B2
(45) Date of Patent: May 30, 2006

(54) PROCESS FOR IMPROVING THE MANEUVERABILITY OF AN AIRCRAFT DURING A RESOURCE

(75) Inventors: Régis Boe, Leguevin (FR); Frédéric Sauvinet, Tournefeuille (FR)

(73) Assignee: AIRBUS France, Toulouse (FR)

( * ) Notice: Subject to any disclaimer, the term of this patent is extended or adjusted under 35 U.S.C. 154(b) by 0 days.

(21) Appl. No.: 11/002,216

(22) Filed: Dec. 3, 2004

(65) Prior Publication Data

US 2006/0060699 A1    Mar. 23, 2006

(30) Foreign Application Priority Data

Dec. 19, 2003   (FR)  .................................. 03 14952

(51) Int. Cl.
*B64C 9/10* (2006.01)
(52) U.S. Cl. ..................... 244/75.1; 244/99.14; 244/82
(58) Field of Classification Search ................ 244/213, 244/215, 82, 87, 75.1, 99.14, 99.2–99.3
See application file for complete search history.

(56) References Cited

U.S. PATENT DOCUMENTS

| | | | | |
|---|---|---|---|---|
| 1,842,859 | A * | 1/1932 | Couzinet | ...................... 244/82 |
| 3,000,595 | A * | 9/1961 | Dorn | ........................... 244/82 |
| 3,363,862 | A * | 1/1968 | Lee et al. | ..................... 244/82 |
| 4,034,334 | A |   7/1977 | Allyn | |
| 4,043,523 | A * | 8/1977 | Bartoe, Jr. | .................. 244/87 |
| 4,825,375 | A |   4/1989 | Nadkarni et al. | |
| 5,002,240 | A |   3/1991 | du Pont | |

* cited by examiner

*Primary Examiner*—Galen Barefoot
(74) *Attorney, Agent, or Firm*—Stevens, Davis, Miller & Mosher, LLP

(57) ABSTRACT

Process for improving the maneuverability of an aircraft during a resource.

Figure 1:
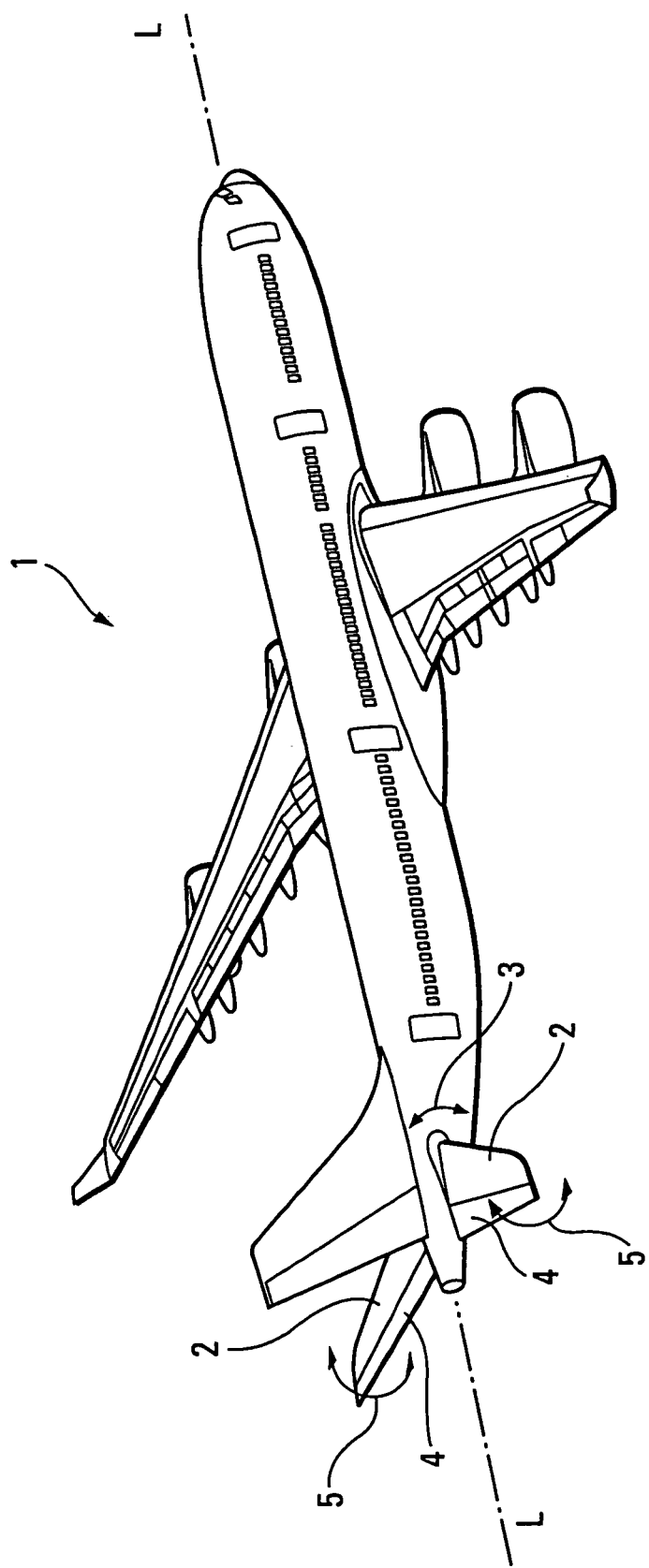

According to the invention, prior to the resource, the adjustable horizontal tailplane (2) is nose-up deflected and the elevators (4) are nose-down deflected.

2 Claims, 3 Drawing Sheets

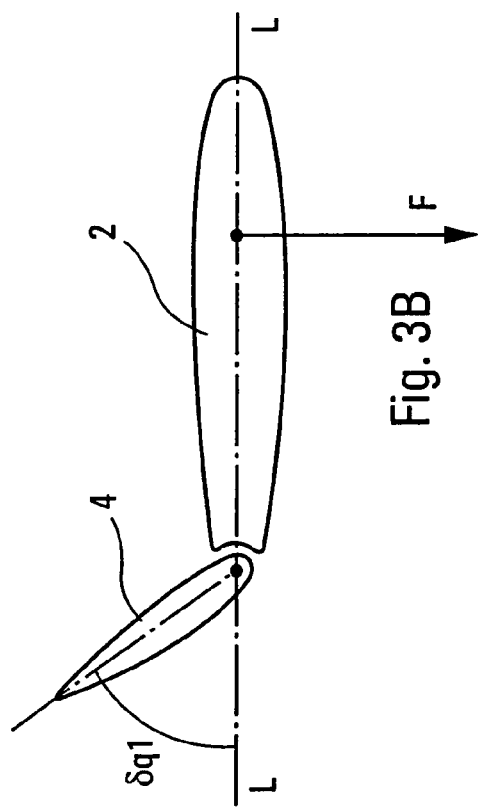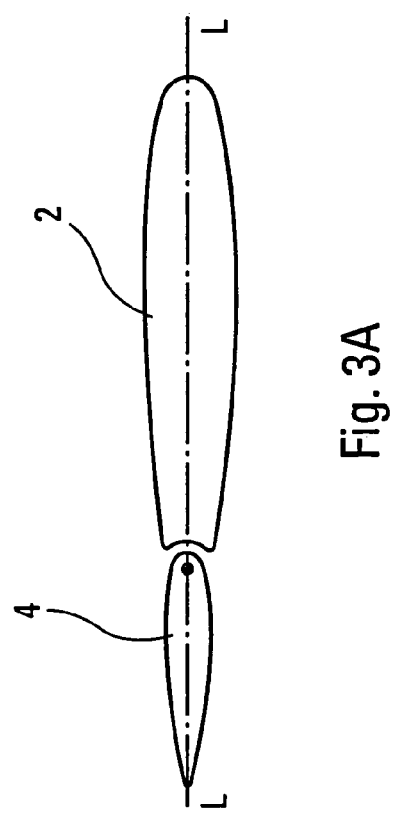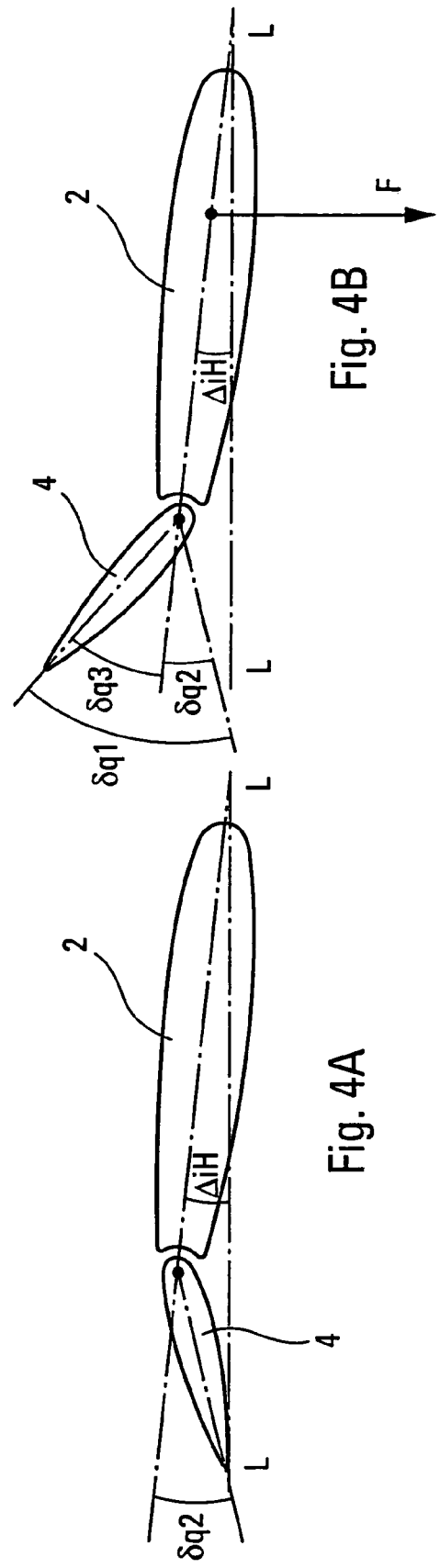

PROCESS FOR IMPROVING THE MANEUVERABILITY OF AN AIRCRAFT DURING A RESOURCE

The present invention relates to a process for improving the maneuverability of an aircraft during a resource.

It is known that certain aircraft comprise a stabilizing horizontal tailplane that can be adjusted in inclination. An adjustable horizontal tailplane such as this is, in the art, designated by one or other of the abbreviations PHR (standing for Plan Horizontal Réglable) of THS (standing for Trimmable Horizontal Stabilizer). Just like a fixed horizontal tailplane, an adjustable horizontal tailplane is provided with elevators forming the trailing edge of said adjustable horizontal tailplane.

An adjustable horizontal tailplane can be deflected in the nose-up or nose-down direction and it is used in certain flight phases. For example, in horizontal cruising flight, said elevators are disposed in direct aerodynamic alignment with said adjustable horizontal tailplane and the assembly oscillates continuously, slowly and with a small amplitude, about the position of zero inclination so as to counter any undesired pitching moment applied to said aircraft.

Regardless of which flight phase the aircraft is in, the pilot may be compelled to instruct a resource, for example during the phase of low-altitude acceleration after takeoff or in flight so as to avoid an obstacle, such as another aircraft, a mountain, etc. In this case, the elevators attached to the adjustable horizontal tailplane are controlled by the pilot of the aircraft so as to take a nose-up position which corresponds to a considerable fraction, if not the entirety, of the nose-up swing of said elevators.

It will readily be understood that, in particular in the case where the weight of the aircraft is high, the maneuverability of the aircraft is insufficient to allow such a resource.

Of course, to solve such a problem, it would be conceivable to increase the power of the system for actuating said elevators and/or their area. However, this would then result in an increase in the weights and costs in respect of the aircraft.

An object of the present invention is to remedy these drawbacks.

To this end, according to the invention, the process for improving the maneuverability of an aircraft during a resource, said aircraft comprising an adjustable horizontal tailplane to which are hinged elevators and being in a flight phase in which said elevators are disposed in direct aerodynamic alignment with said adjustable horizontal tailplane is noteworthy in that, prior to the deployment of said elevators in respect of the resource:

said adjustable horizontal tailplane is deflected, in the nose-up direction; and said elevators are deflected in the nose-down direction, in such a way that the combination of the nose-up action of said adjustable horizontal tailplane and of the nose-down action of said elevators engenders a resultant aerodynamic force which is at least approximately equal to that engendered by the assembly of said adjustable horizontal tailplane and of said elevators in said flight phase preceding the resource.

Thus, by virtue of the present invention, for an aerodynamic action preceding the resource equivalent to that prevailing in said flight phase preceding the resource, the position of the elevators, from which their deflection will be performed at the moment of the resource, is shifted toward the nose-down values, thereby increasing the maneuverability of the aircraft.

Moreover, as the nose-up deflection travel of said elevators with respect to said adjustable horizontal tailplane is reduced, this brings about a decrease in the loads applied to said elevators at the moment of the resource.

The process of the invention applies to any flight phase preceding the resource. If this flight phase is a horizontal cruising flight in the course of which said adjustable horizontal tailplane and its elevators engender an almost zero pitching force, then matters are contrived such that said resultant aerodynamic force is itself at least approximately zero.

The figures of the appended drawing will elucidate the manner in which the invention may be embodied. In these figures, identical references denote similar elements.

FIG. 1 shows, in diagrammatic perspective, a wide-bodied civil aircraft provided with an adjustable horizontal tailplane.

Figure 2:
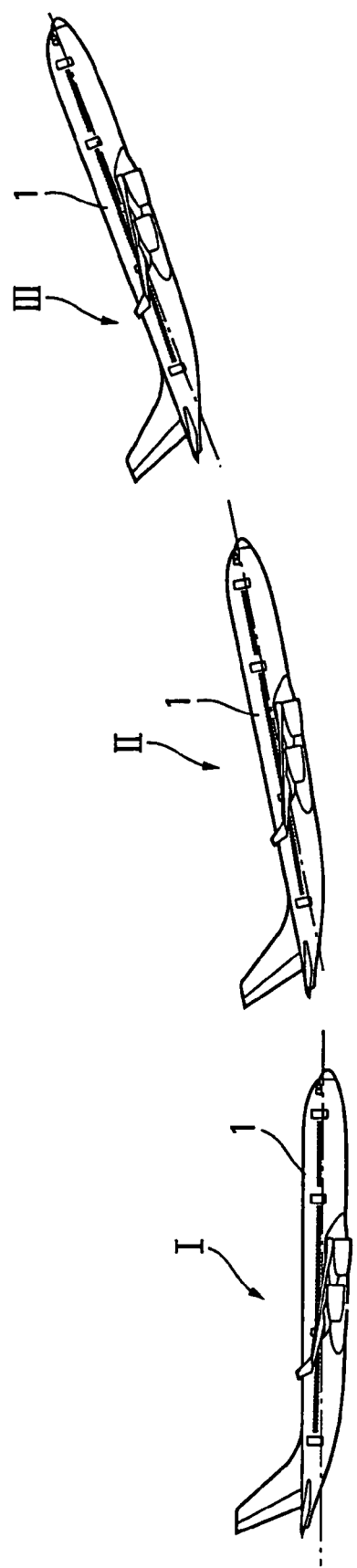

FIG. 2 diagrammatically illustrates, three successive positions of said aircraft, including the start of the resource.

FIGS. 3A and 3B illustrate, by way of diagrammatic example, the customary positioning of the adjustable horizontal tailplane and of the elevators attached thereto, respectively in cruising flight and from the start of the resource.

FIGS. 4A and 4B diagrammatically show, by way of comparison with the example of FIGS. 3A and 3B, an exemplary positioning, in accordance with the invention, of the adjustable horizontal tailplane and of the elevators, respectively before and from the start of the resource, the phase of commencement of the resource being cruising.

The wide-bodied airplane 1, shown diagrammatically by FIG. 1, exhibits a longitudinal axis L—L and comprises a horizontal tailplane 2 that can be adjusted in inclination, as is illustrated by the double arrow 3. To the rear edge of said adjustable horizontal tailplane 2 are hinged elevators 4 that can turn with respect to said tailplane 2, as is illustrated by the double arrows 5.

Illustrated in FIG. 2 are three situations I, II and III experienced by said airplane 1 during a resource.

In situation I, the aircraft 1 is in cruising flight with its adjustable horizontal tailplane 2 at zero or almost zero inclination and with the elevators 4 in direct aerodynamic alignment with said adjustable horizontal tailplane 2 (see FIG. 3A). In this customary configuration, the assembly of said adjustable horizontal tailplane 2 and of the elevators 4 engenders almost no aerodynamic pitching force.

Still in a customary manner, when the aircraft 1 has to perform a resource (situation II in FIG. 2), the pilot actuates the elevators 4 so as to make them take a nose-up position, defined by an angle of swing $\delta q1$ with respect to the adjustable horizontal tailplane 2 (see FIG. 3B). The assembly of said adjustable horizontal tailplane 2 and of the elevators 4 then engenders a nose-up aerodynamic force F, producing a nose-up pitching moment.

After instigation of the resource and stabilization of the aircraft on an inclined trajectory (situation III in FIG. 2), the elevators 4 are brought back into direct aerodynamic alignment with said tailplane 2.

As mentioned hereinabove, especially if the weight of the aircraft 1 is high, the latter may lack maneuverability in respect of making the elevators 4 pass from their position of FIG. 3A to their position of deployment of FIG. 3B.

To remedy this drawback, the present invention operates in the manner illustrated in FIGS. 4A and 4B, namely:

during cruising flight illustrated by situation I of FIG. 2 and prior to the resource, the adjustable horizontal tailplane 2 is inclined by a nose-up angle $\Delta iH$, and simultaneously, the elevators 4 are deflected in the inverse direction to the adjustable horizontal tailplane 2, that is to say in the nose-down direction, so as to take a nose-down angle δq2 with respect to said tailplane 2.

In this procedure, illustrated by FIG. 4A, the angles ΔiH and δq2 are chosen such that the aerodynamic force engendered by the combination of the adjustable horizontal tailplane 2 and of the elevators 4 is zero or virtually zero, as in the configuration of FIG. 3A.

As a result of the foregoing, when the elevators 4 are nose-up deflected, during the resource, by the angular swing δq1 so as to engender the nose-up aerodynamic force F (see FIG. 4B), the initial part of amplitude δq2 of this deflection is performed easily and without stress. Moreover, with respect to the adjustable horizontal tailplane, said elevators 4 undergo a maximum deflection δq3 equal only to the difference δq1–δq2.

Thus, in the configuration in accordance with the present invention illustrated by FIGS. 4A and 4B, during the resource, the maneuverability of the aircraft 1 is improved and the elevators 4 undergo lower aerodynamic loads than those to which they are subject in the customary configuration of FIGS. 3A and 3B.

The invention claimed is:

1. A process for controlling an aircraft having to perform a resource, said aircraft comprising an adjustable horizontal tailplane to which are hinged elevators, and said aircraft being in an initial flight phase in which said elevators are disposed in direst aerodynamic alignment with said adjustable horizontal tailplane, said process comprising the steps of:

simultaneously deflecting said adjustable horizontal tailplane in the nose-up direction and deflecting said elevators in the nose-down direction, in such a way that the combination of the nose-up action of said adjustable horizontal tailplane and of the nose-down action of said elevators engenders a resultant aerodynamic force which is at least approximately equal to that engendered by the assembly of said adjustable horizontal tailplane and of said elevators in said initial flight phase; and then deflecting said elevators in the nose-up direction in order to perform said resource.

2. The process of claim 1, wherein said initial flight phase is a cruising flight and said resultant aerodynamic force is at least approximately zero.

* * * * *